(12) United States Patent
Norris et al.

(10) Patent No.: US 9,081,119 B2
(45) Date of Patent: Jul. 14, 2015

(54) UNDERSEAS SEISMIC ACQUISITION

(75) Inventors: Michael W Norris, Cypress, TX (US);
Marvin L Johnson, Chromo, CO (US)

(73) Assignee: ExxonMobil Upstream Research Company, Spring, TX (US)

( * ) Notice: Subject to any disclaimer, the term of this patent is extended or adjusted under 35 U.S.C. 154(b) by 1229 days.

(21) Appl. No.: 12/669,734

(22) PCT Filed: Jul. 9, 2008

(86) PCT No.: PCT/US2008/008400
§ 371 (c)(1),
(2), (4) Date: Jan. 19, 2010

(87) PCT Pub. No.: WO2009/023071
PCT Pub. Date: Feb. 19, 2009

(65) Prior Publication Data
US 2010/0182870 A1  Jul. 22, 2010

Related U.S. Application Data

(60) Provisional application No. 60/964,257, filed on Aug. 10, 2007.

(51) Int. Cl.
*G01V 1/38* (2006.01)

(52) U.S. Cl.
CPC ................... *G01V 1/3808* (2013.01)

(58) Field of Classification Search
CPC .................................................. G01V 1/3808
USPC ............. 367/15–16, 20; 405/154.1, 158, 164, 405/174, 190
See application file for complete search history.

(56) References Cited

U.S. PATENT DOCUMENTS

| 3,923,121 A | 12/1975 | Kruppenbach et al. ....... 181/112 |
| 3,954,154 A | 5/1976 | Kruppenbach et al. ....... 181/112 |

(Continued)

FOREIGN PATENT DOCUMENTS

| EP | 0154968 | 9/1985 | .............. G01V 1/38 |
| GB | 1376513 | 12/1974 | .............. G01V 1/38 |
| GB | 2443843 B | * 5/2011 | |

OTHER PUBLICATIONS

Brown, A. (1983) "Seismic on the Pack Ice," *The Leading Edge*, 2, No. 10, pp. 12-16.

(Continued)

*Primary Examiner* — Krystine Breier
(74) *Attorney, Agent, or Firm* — ExxonMobil Upstream Research Company Law Dept.

(57) ABSTRACT

The described invention relates to a method for acquiring seismic data in icy waters comprising positioning a fixed structure or movable vessel (102) at or near an established water opening; deploying into the water opening, from said structure or vessel one or more ROV or AUV units (104), said ROV or AUV units remaining connected to said structure or vessel; operating the one or more ROV or AUV units to deploy seismic sensors recording equipment (106) and/or one or more seismic source equipment (108) on or near the water bottom; generating and applying control signals to one or more of the more ROV or AUV units to generate and to record seismic signals (110); operating the one or more ROV or AUV units on the water bottom to move (114) and/or recover (116) the seismic source equipment and/or seismic sensors recording.

14 Claims, 4 Drawing Sheets

(56) References Cited

U.S. PATENT DOCUMENTS

| | | | | |
|---|---|---|---|---|
| 4,016,951 A | | 4/1977 | Dick et al. | 181/109 |
| 4,139,074 A | | 2/1979 | White | 181/120 |
| 4,372,420 A | * | 2/1983 | White | 181/120 |
| 4,387,450 A | * | 6/1983 | Zachariadis | 367/20 |
| 4,616,348 A | | 10/1986 | Ostrander | 367/21 |
| 4,621,347 A | | 11/1986 | Ostrander | 367/21 |
| 4,730,692 A | | 3/1988 | Fair et al. | 181/114 |
| 4,775,028 A | | 10/1988 | de Heering | 181/124 |
| 4,998,227 A | | 3/1991 | Rygg et al. | 367/177 |
| 5,031,718 A | | 7/1991 | Peavey | 181/114 |
| 5,157,636 A | | 10/1992 | Bjerkoy | 367/15 |
| 5,408,441 A | | 4/1995 | Barr et al. | 367/15 |
| 5,550,786 A | | 8/1996 | Allen | 367/48 |
| 5,715,213 A | | 2/1998 | Allen | 367/48 |
| 5,719,821 A | | 2/1998 | Sallas et al. | 367/41 |
| 5,747,754 A | * | 5/1998 | Svenning et al. | 367/17 |
| 5,781,503 A | | 7/1998 | Kim | 367/45 |
| 5,790,473 A | | 8/1998 | Allen | 367/57 |
| 5,978,316 A | * | 11/1999 | Ambs et al. | 367/134 |
| 6,012,406 A | | 1/2000 | Dudley et al. | 114/77 |
| 6,474,254 B1 | * | 11/2002 | Ambs et al. | 114/312 |
| 6,475,254 B1 | * | 11/2002 | Saak et al. | 51/307 |
| 6,588,980 B2 | | 7/2003 | Worman et al. | 405/158 |
| 6,901,028 B2 | * | 5/2005 | Clayton et al. | 367/68 |
| 6,975,560 B2 | | 12/2005 | Berg et al. | 367/16 |
| 7,359,283 B2 | * | 4/2008 | Vaage et al. | 367/24 |
| 2006/0159524 A1 | | 7/2006 | Thompson et al. | 405/190 |
| 2008/0144435 A1 | * | 6/2008 | Morley | 367/21 |
| 2009/0126616 A1 | * | 5/2009 | Srinivasan | 114/264 |

OTHER PUBLICATIONS

Mertz, R. (1981) "Deepwater Vibrator Operations—Beaufort Sea, Alaska, 1979 Winter Season," *Geophysics*, vol. 46. No. 2, pp. 171-181.

Proubasta D. (1985) "Ice Saw—An Incisive Solution to Seismic Noise," *The Leading Edge*, 4, No. 10, pp. 18-23.

PCT International Search and Written Opinion dated Oct. 1, 2008, 8 pgs.

"Remotely operated underwater vehicle," Wikipedia on ROV and AUV.

* cited by examiner

UNDERSEAS SEISMIC ACQUISITION

CROSS REFERENCE TO RELATED APPLICATIONS

This application is a National Stage entry under 35 U.S.C. 371 of PCT/US2008/08400 that published as WO 2009/023071 and was filed on Jul. 9, 2008 and claims the benefit of U.S. Provisional application 60/964,257 which was filed on Aug. 10, 2007.

FIELD OF INVENTION

This invention relates generally to the field of geophysical prospecting, and more particularly to seismic data acquisition in underwater bottom areas where the water surface is of ice, partially covered with ice, as with ice floes, or of freezing surface conditions.

BACKGROUND OF THE INVENTION

Seismic acquisition in frigid areas has always been difficult and potentially dangerous. This is especially true when the seismic acquisition is in marine areas that are partially or completely covered by ice. When open or partially obstructed water is available in these regions, it is only available for a limited period of time.

Initially dynamite was used as an energy source but air guns and vibrators replaced dynamite as energy sources due to the negative environmental impact dynamite might have. Air guns are a well known seismic energy source; but require that many access holes be drilled so the air guns can be placed into the water column under the ice. This is not only a slow process; but severely limits the size of the air gun array. Limiting the size of the air gun array has the potential to degrade the final seismic image.

Vibrators when used on the surface of pack ice generate large amplitude events known as ice flexure waves which seriously obscure the desired seismic reflection data. Technical literature and patents have addressed improvements but do not completely correct the problems. Several proposals eliminate the generation mechanism by directly coupling the vibrator to the ocean bottom, for example, using bottom penetration means. Practical considerations of stilt-leg (supporting or connecting means for connecting the penetration means to a support vessel, etc.) weight and longitudinal strength would limit the water depth to which this solution could be employed and limit the weather conditions under which it could be operated.

Beyond the technical issues associated with seismic sources and receivers, operations in frigid weather on pack ice present very significant safety and logistic issues. Pack ice is not static. In point of fact it is continuously moving and reforming. In this process, leads, open water areas, fissures, ice ridges and crevasses are created. Because of the continuing changes in the surface conditions, it is important to be able to quickly locate and extract personnel. The use of helicopters in these conditions is typical.

The use of Autonomous Underwater Vehicles ("AUV units") and Remotely Operated Vehicles ("ROV units") is taught in U.S. Pat. Nos. 6,474,254, 6,975,560, 6,588,980 and EP publication 0154968. These patents address the use of ROV units and AUV units to deploy and collect receiver data; but only address half of the problem because they use conventional, open water air gun sources. GB 1,376,513 addresses both sources and receivers; but proposes to deploy the sources (explosive charges) and receivers (hydrophones) from a submarine. The use of a submarine would effectively limit the exploration to deeper waters and would limit the receivers to be marine streamer, hydrophone cables. U.S. Pat. No. 4,730,692 describes the use of an ROV based source; but only for shear wave generation and without addressing the need for receivers.

There is a continuing need for a seismic acquisition methodology that can safely provide high production rates when acquiring data from under ice-covered water resources and can accommodate state of the art seismic techniques such as 3D and high density sampling. Additionally the methodology needs to be applicable to both summer and winter acquisition so seismic data acquisition can occur on a year round basis. High production rates and year round access are especially important when time critical 4D acquisition is to be employed.

SUMMARY OF THE INVENTION

The described invention relates to a method for acquiring seismic data in a body of water. The method comprises a) positioning a control station at or near a surface of the body of water; b) deploying into the body of water, from said control station one or more ROV or AUV units, said ROV or AUV units remaining at least intermittently connected to said control station; c) operating the one or more ROV or AUV units to deploy seismic sensors recording equipment on or near the bottom of the body of water; d) operating the same or another of the one or more ROV or AUV units to deploy seismic source equipment on or near the bottom of the body of water; e) generating and applying control signals to one or more of the ROV or AUV units for transfer to the equipment of c) and d) to generate and to record seismic signals; f) operating the one or more ROV or AUV units within the water to move the seismic source equipment and/or seismic sensors recording equipment to other locations, and to repeat c) through e) until completion.

In one or more preferred embodiments the seismic source is vibratory and can be attached to one or more ROV or AUV units, if not to one more floating ice floes, such as by cables or suitably reinforced hoses or tubes capable of carrying electrical connecting wires, or other means.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

In one embodiment of the present invention a method for acquiring seismic data is provided. The method includes the use of remote operated vehicles (ROV) on the bottom of a body of water (e.g. the sea floor) to seismic sensors recording equipment and source equipment. The ROV may be controlled by an umbilical operatively connected to a control station on the surface, the sensors may be moved or relocated and arranged in a variety of configurations. Further the control station may be located on a layer of ice, on a boat, or on an ice floe and the system may include more than one such control station.

The invention method permits seismic data acquisition in an efficient manner that can reduce or limit exposure of seismic workers to the elements present in the frigid or Arctic areas where natural resources may be found. Generally speaking, the fixed structure or movable vessel, or a plurality of either, or both, is located at one or more access points at the surface of the water, or at an opening in the ice cover, in the proximity of the water bottom to be explored. As with normal seismic acquisition, the access points can be arranged to provide adequate sites for 2D, 3D or 4D (two, three or four dimensional seismic imaging, respectively) and the shelter/control stations provided by the structure(s) or vessel(s) are provided at each access point. The access points thus may be established along a survey line (2D), for an area (3D), or for multiple area surveys with respect to time (4D), all positioned with respect to the area to be explored. The shelter/control surface stations remain readily accessible to allow quick removal of personnel and/or surface equipment by surface (e.g., rescue vessel) or by air (e.g., helicopter) when conditions turn threatening.

Figure 1:
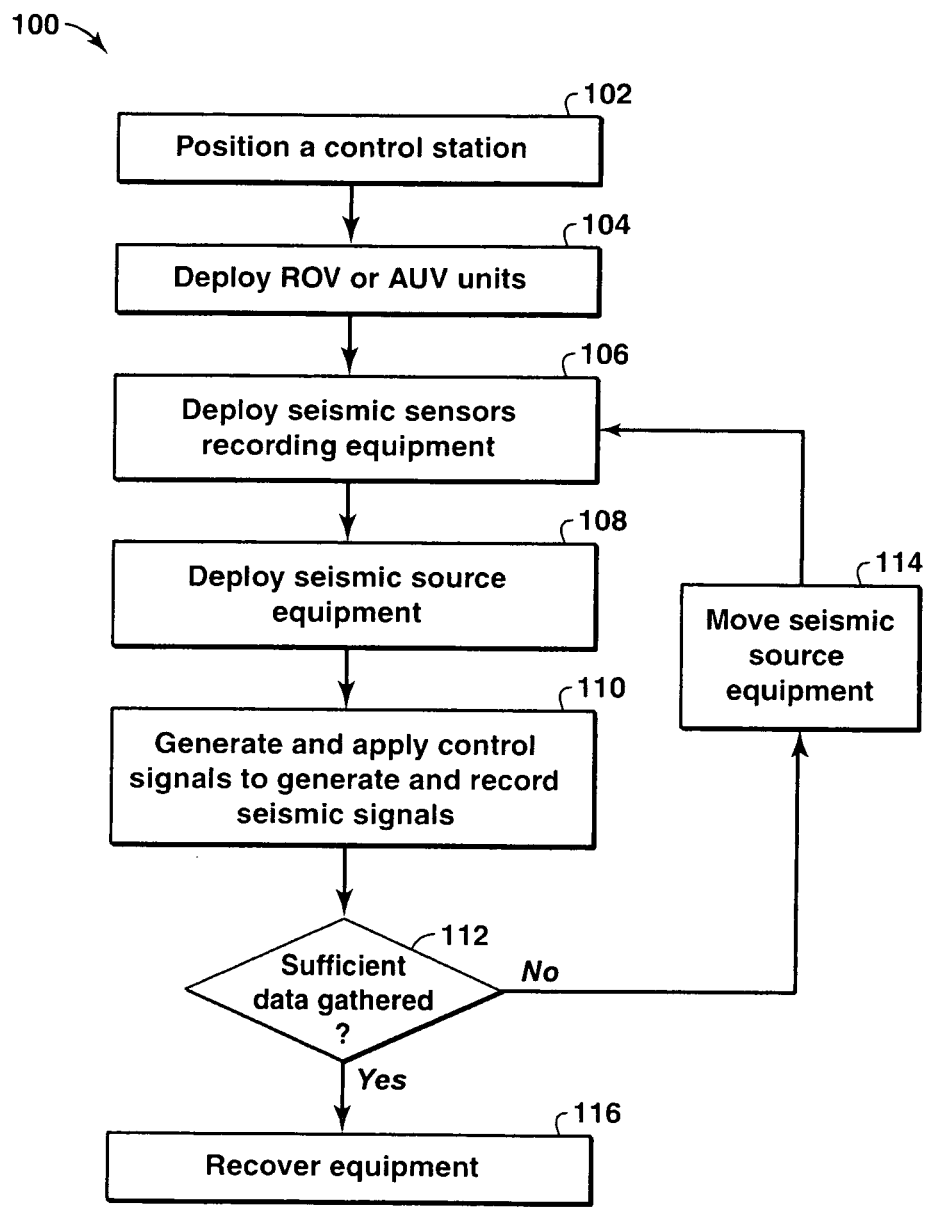
FIG. 1 Illustration of an exemplary water bottom acquisition method.

Referring now to the figures, FIG. 1 illustrates a flow chart of an exemplary embodiment of a method 100 for acquiring seismic data in a body of water. The method 100 includes positioning a control station 102 at or near the surface of the body of water, deploying a remote operated vehicle (ROV) or autonomous underwater vehicle (AUV) at or near the bottom of the body of water 104, deploying seismic sensor recording equipment 106 using the ROV or AUV, deploying seismic source equipment 108, and generating and applying control signals to generate and record seismic signals 110. If the seismic data acquisition is sufficient, then the method 100 is complete 112, but if not, the equipment may be moved 114, redeployed 106, 108 and more seismic signals are generated and recorded 110. This is repeated until sufficient data is acquired, then the operation is done 116.

Figure 2:
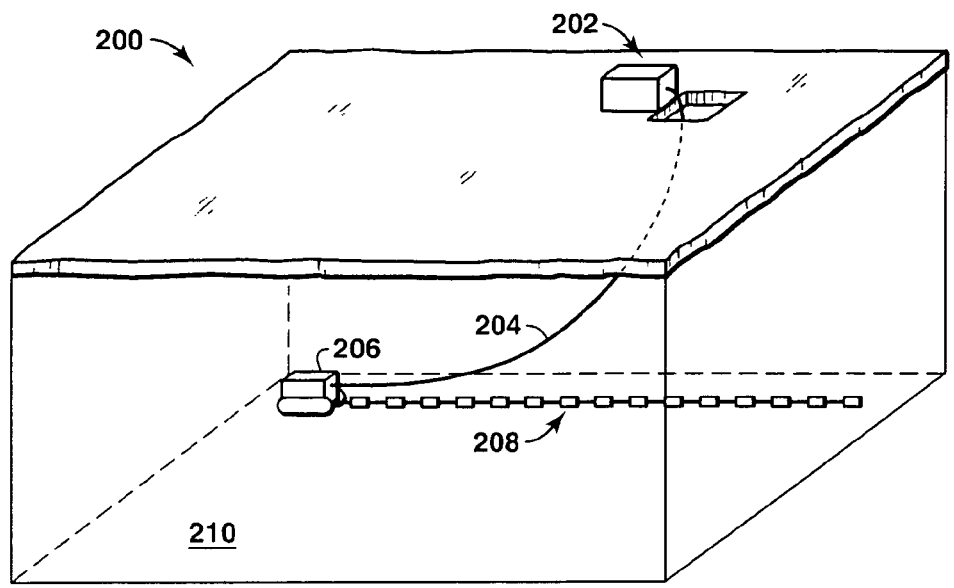
FIG. 2 Illustration of an exemplary water bottom acquisition where the seismic source tows the sensor array and a single surface based access point is used.

Referring now to FIG. 2, an illustration of an exemplary water bottom acquisition 200 where the seismic source tows the sensor array and a single surface based access point is used in accordance with the method of FIG. 1. Hence, FIG. 2 may be best understood with reference to FIG. 1. The data acquisition system 200 includes a control station 202, an umbilical 204 operatively connected to an ROV or AUV 206, which is towing seismic sensors 208 along the bottom of the body of water 210.

Figure 3:
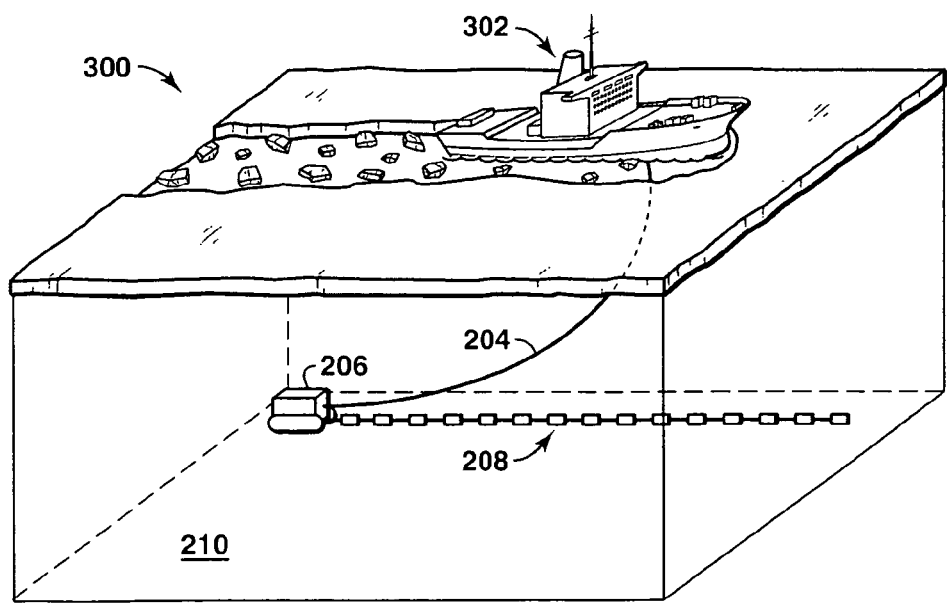
FIG. 3 Illustration of an exemplary water bottom acquisition where the seismic source tows the sensor array and a single vessel based access point is used.

FIG. 3 illustrates an exemplary water bottom acquisition 300 where the seismic source tows the sensor array and a single vessel based access point is used in accordance with the method of FIG. 1. As such, FIG. 3 may be best understood with reference to FIG. 1. The data acquisition system 300 includes a control station 302 on a marine vessel, an umbilical 204 operatively connected to an ROV or AUV 206, which is towing seismic sensors 208 along the bottom of the body of water 210.

Once the shelter/control surface station(s) 202 or 302 have been established 102, ROV units and AUV units 206, sources (s) and receiver(s) 208 are deployed 104 through the water opening at the access point using a connecting tether 204, lead wire, cable, and the like, and placed on or in proximity to the ocean bottom 210. Though AUV units 206 may be autonomously operated, they will at least be intermittently connected with a shelter control station 202, 302 for replenishing power and transferring signal information for seismic source (s) 208, and receiving recorded data from the seismic sources 208. The ROV units and AUV units 206 thus preferably remain connected to the surface stations 202, 302. In a preferred embodiment, the ROV units and/or AUV units 206 are controlled and powered from the shelter/control stations 202, 302 through the connecting tether 204, etc., and are in turn used to move the seismic source(s) and receivers 208 to other proximate areas 110 to enable the acquisition of the seismic data over a broad area. The tether 204 may of course be used to retrieve the deployed ROV units and/or AUV units 206, and any equipment attached to them, when data acquisition is deemed complete 116, or when repairs or replacement equipment becomes desirable. The tether 204 thus may be, or include, an electric signal carrying cable, and may include a strength contributing lead wire or solid cable. All will be designed for and capable of underwater use and operation in accordance with knowledge in the field.

Figure 4:
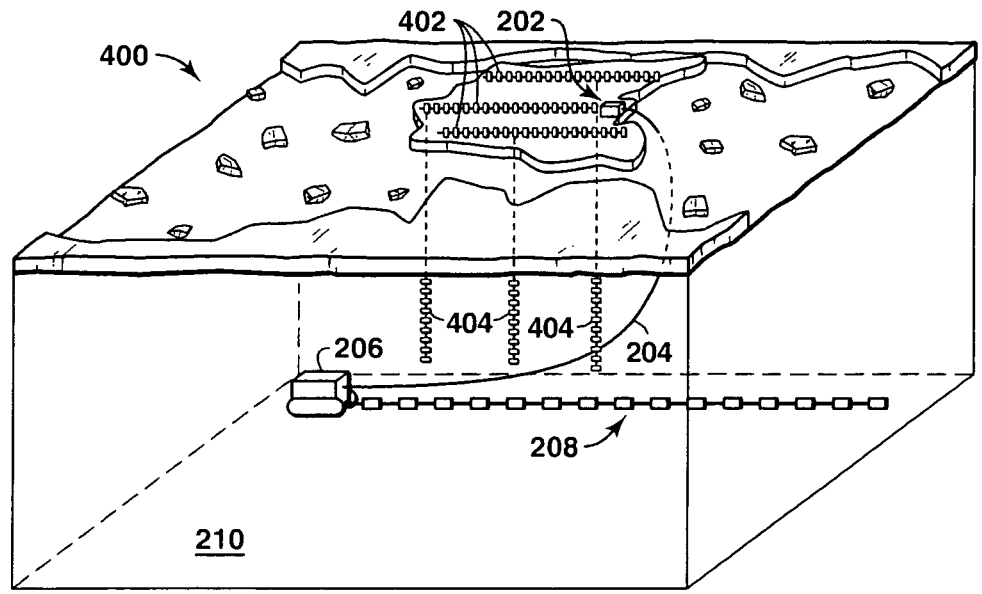
FIG. 4 Illustration of an exemplary water bottom acquisition where the seismic source tows the sensor array and an ice floe is used as a base for the acquisition support hardware. Additional sensors are shown deployed on the ice surface and/or in vertical arrays and are connected to the support hardware.

Referring now to FIG. 4, an exemplary water bottom acquisition 400 where the seismic source tows the sensor array and an ice floe is used as a base for the acquisition support hardware using the method of FIG. 1 and elements of the system of FIG. 2. Hence, FIG. 4 may be best understood with reference to FIGS. 1 and 2. The seismic data acquisition system 400 includes a control station 202, an umbilical 204 operatively connected to an ROV or AUV 206, which is towing seismic sensors 208 along the bottom of the body of water 210. Also, additional sensors are shown deployed on the ice surface 402 and/or in vertical arrays 404 and are connected to the support hardware 202.

Figure 5:
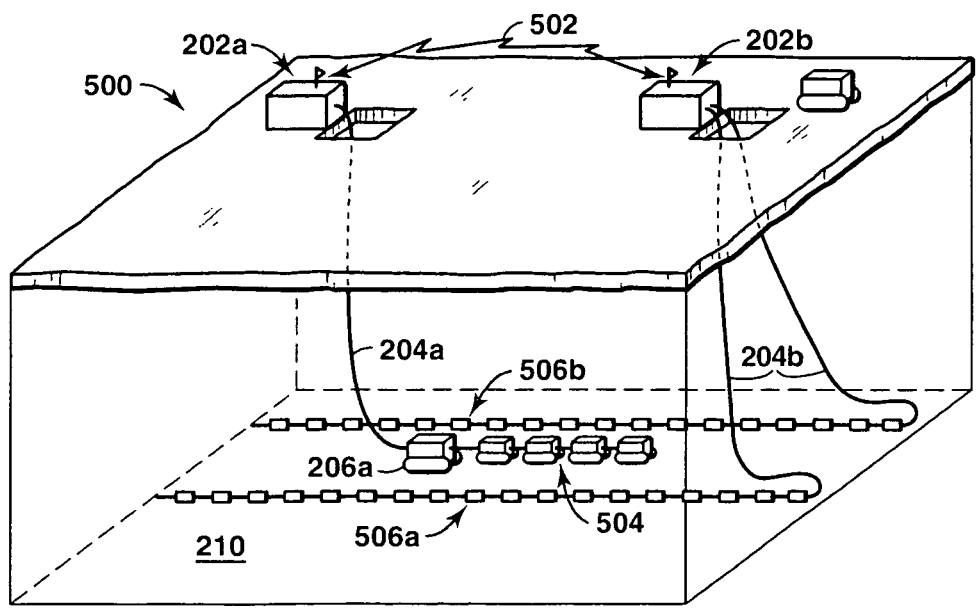
FIG. 5 Illustration of an exemplary bottom referenced acquisition where static, cable based receiver spread is used with a single, moving set of seismic sources and multiple surface based access points communicating by telemetry are used.

FIG. 5 illustrates an exemplary bottom referenced acquisition 500 where a static, cable based receiver spread is used with a single, moving set of seismic sources and multiple surface based access points 202 communicating by telemetry are used according to the method of FIG. 1. As such, FIG. 5 may be best understood with reference to FIGS. 1 and 2. The seismic data acquisition system 500 includes multiple control stations 202a-202b, each having at least one umbilical 204a-204b and in communication with each other via a communication path 502. One control station 202a may be operatively connected to an ROV or AUV 206a (there may be a spare ROV or AUV 206b available), which is towing seismic source equipment 504 along the bottom of the body of water 210. The other control station 202b may be operatively connected to an array or arrays of seismic recording equipment 506a-

506b. Note that in FIGS. 2-4, the source equipment 504 and recording equipment 506 were combined in the description of sensors 208.

Figure 6:
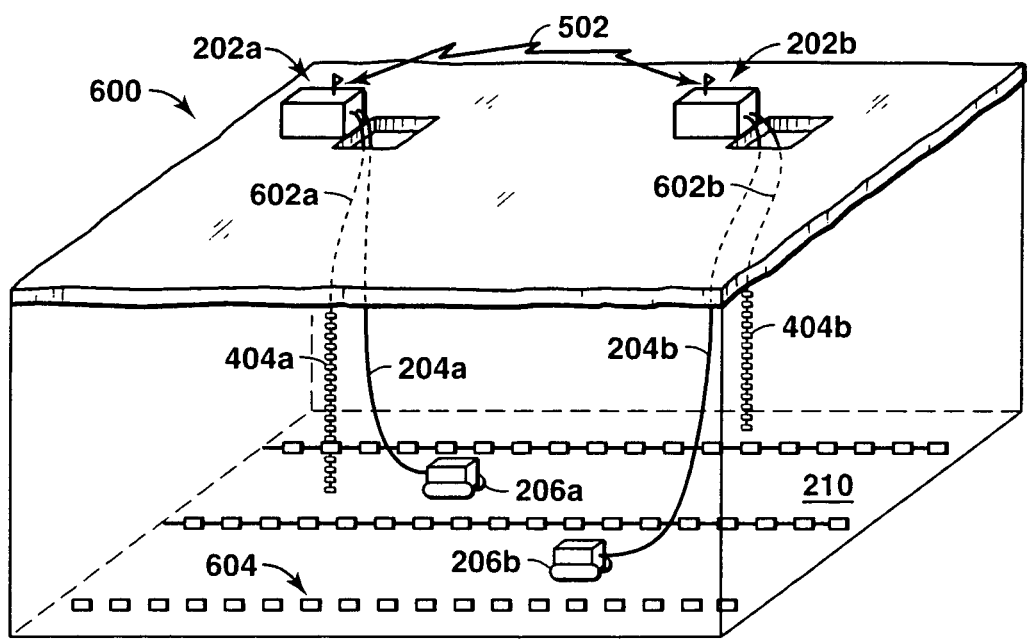
FIG. 6 Illustration of an exemplary bottom referenced acquisition where static, node style receiver spread is used with multiple, moving seismic source and multiple surface based access points are pictured.

FIG. 6 illustrates an exemplary bottom referenced acquisition 600 where static, node style receiver spread is used with multiple, moving seismic source of FIG. 5 and multiple surface based access points using the method of FIG. 1. As such, FIG. 6 may be best understood with reference to FIGS. 1 and 5. The seismic data acquisition system 600 includes multiple control stations 202a-202b, each having at least one umbilical 204a and 602a or 204b and 602b and in communication with each other via a communication path 502. One umbilical 204a-204b may be operatively connected to an ROV or AUV 206a-206b, and the other umbilical 602a-602b may be connected to a vertical sensor array 404a-404b. The system 600 may also include a node style receiver spread 604. Note, that although only two control stations 202a-202b, it is intended that three or more such stations 202 may be used in combination with the other apparatuses shown and the quantity two is not a limiting feature, but an exemplary embodiment used for illustrative purposes only.

In a preferred embodiment, a seismic source 504 is connected to one or more of the ROV units or AUV units 206a such that they can be moved 108 and powered as needed. The seismic source 504, for the purposes of this description and claims, means a movable, structural site where energy is generated using power derived from the shelter/control stations 202a and from which the energy can be projected to or injected into the earth. In a preferred embodiment, one or more of the seismic sensors 208 are attached similarly to one or more of the ROV units or AUV units. The seismic sensors 208 are signal receivers capable of detecting and recording/transmitting the signal 110 to the shelter/control stations 202. Typically the seismic sensors 208 will comprise geophones and accelerometers, plus at least one hydrophone, housed in one or more autonomous cases that are sealed to prevent the incursion of water (commonly called nodes) and connected to one or more of the ROV units or AUV units 206. Multiple node seismic sensor arrays are typically preferred, and particularly with one or more ROV units or AUV units 206 being so assembled. In an alternative embodiment, the seismic source (not shown in this embodiment) is located within one or more of the ROV units and/or AUV units 206. Preferably in this embodiment, the seismic source is a vibratory one and the one or more ROV units and/or AUV units 206 in or on which it is attached is constructed to withstand both the underwater marine environment and constant vibration to which it may be subjected. Preferred seismic sources include linear motor vibrators, particularly electro-hydraulic vibrators, which preferably are using the High Fidelity Vibratory Seismic Method (HFVS) style acquisition of U.S. Pat. Nos. 5,719, 821, 5,790,473, 5,715,213 and 5,550,786, the descriptions of which are incorporated by reference.

Alternatively, the seismic sources can be the well-known impulsive seismic sources such as air guns, accelerated weight drops or explosive charges, or sparkers, but as noted, are preferably vibratory sources. Bottom referenced vibratory sources are preferred because they generate energy directly into the ocean bottom 210 and do not require that the energy be coupled to the ocean bottom 210 via the water column. Additionally the emitted source spectrum is more easily controlled for vibratory sources than for impulsive sources. This is an important point with respect to the environmental impact the seismic sources may have on ocean dwelling animals. The use of vibratory sources may allow for high production rates.

A single access point can be used, for example, as illustrated in FIGS. 2, 3, and 4. The use of single access points are most applicable to 2D acquisition whereas the simultaneous use of multiple access points, FIG. 5 and FIG. 6, is most applicable to 3D and 4D seismic acquisition. To simplify the figures, the hardware for the navigation and positioning system(s) has been omitted.

When multiple simultaneous access points 202a-202b are used, not all of the access points 202a-202b need to be manned. Some of the access points (e.g. 202b) can be remotely controlled from a primary control station (e.g. 202a). The telemetry link 502 between the access points 202a-202b is preferable via radio or satellite based; but the access points 202a-202b can be linked 502 via physical electrical or fiber optic cable. Linking 502 the access points 202a-202b with physical cable is undesirable because of the time required to traverse over pack ice and the dangers associated with traversing pack ice. Remote control of some or all of the access points 202a-202b is a preferred methodology since it limits personnel exposure to the elements and allows personnel to be easily located and retrieved when hazardous or emergency conditions occur.

The shelter/control station 202 or structure is self-contained and capable of supporting and sustaining personnel for extended periods of time. The structures 202 can be buoyant and capable of operating in open water. Being buoyant allows the structures 202 to be used in areas that are only partially ice covered and provide a safe haven when leads form in the pack ice. Additionally, structures for electrical or hydraulic power packs (not shown) could also be buoyant and have integrated spill-control systems in accordance with the knowledge of those skilled in the art. The shelter/control structures 202 can be towed over the ice surface or transported via a vessel; but preferably the shelter/control structures 202 should be capable of being deployed via a helicopter. Helicopter deployment reduces the time required to deploy a shelter/control structure 202 and simplifies recovery during emergency situations.

The seismic receivers 208 can be formed into receiver sets that can be moved with the seismic source 206 as shown in FIG. 2 or deployed as independent, static cable sets where the receiver sets 506a-506b and sources 504 move independently, FIG. 5, or deployed as individual receiver nodes 604 as shown in FIG. 6. Generally speaking receiver sets are physical sites where at least one sensor is located. These sites are then generally strung or tethered together in arrays 208 that are connected to one of the AUV units, ROV units 206, or even in some cases the tending structure or vessel 202 at the surface.

In some embodiments a receiver set can comprise a hydrophone acting as a single pressure sensor. In other embodiments the receiver set can be equipped to operate in a 1C, 2C, 3C, or 4C, or combined mode, where "C" refers to "component." The 1C mode provides single axis (vertical) particle motion sensor. The 2C mode comprises both a single axis (vertical) particle motion detector and a single pressure sensor. The 3C mode comprises receiver equipment capable of measuring three-axis particle motion. The 4C mode combines the use of the 3C mode plus a least one pressure sensor. Note that the pressure sensor is configured to measure scalar quantities, the other sensor components may be configured to measure vector quantities, and the combined mode may combine scalar and vector quantities or measurements. Thus the seismic sensors can be single hydrophones or arrays of hydrophones or preferably be 4C sensors measuring pressure along with particle displacement, velocity or acceleration.

As illustrated in FIG. 4 and FIG. 6, in addition to the receiver sets 208, 506a-506b that are on or in proximity to the ocean bottom, vertical arrays of receivers 404 connected with one or more control station 202, i.e., structure or vessel at the surface, can be used. Vertical arrays 404 would be useful for determining near surface characteristics of the ocean bottom and the ice cover. Vertical receiver arrays 404 could be used in lieu of bottom referenced receiver sets 208; but using only vertical arrays 404 without bottom referenced receivers 208 would effectively reduce the production rates because of the limited spatial extent of imaging from the vertical cable(s).

The methodology accommodates simple, two dimensional ("2D") acquisition geometries as illustrated in FIG. 2 and FIG. 3, complex 3D acquisition geometries as shown in FIG. 5 and FIG. 6 and random and complex acquisition geometries as shown in FIG. 4.

The acquisition geometry shown in FIG. 4 makes use of the natural movement of the arctic ice to cover a large area in a random fashion. The randomness is created by the unpredictable aspect of the ice pack movement. Several such acquisition setups could be utilized to acquire seismic data over a large spatial area. This method of acquisition would be most advantageous for 3D and swath style seismic surveys.

Preferably, the source is incorporated into the ROV, FIG. 2, FIG. 3 and FIG. 6; but depending on the energy required to adequately create the seismic image, multiple arrayed vibrators, FIG. 5, or multiple simultaneous vibrator sources, FIG. 6 can be used. When multiple simultaneous vibrator sources are used, it is preferable to utilize the High Fidelity Vibratory Seismic Method (HFVS) style acquisition which maximizes the recoverable energy and adapts to changing bottom conditions.

In a preferred embodiment each receiver site or unit 208, 506a-506b will have at least 3 particle motion sensors (i.e. geophones or accelerometers) and one pressure sensor (for 4C mode operation). There is value as well in having more than three particle motion sensors and more than one hydrophone, for example two or three or more, at each receiver site or unit 208, 506a-506b While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

The invention claimed is:

1. A method for acquiring seismic data in a body of water, said body of water being covered by ice or ice floes, comprising:
   a) positioning a control station at or near an opening in the ice cover, said control station being a fixed structure or a marine vessel;
   b) deploying into the body of water under the ice or ice floes from said control station one or more ROV units, each said ROV unit being an unmanned unit that remains tethered by an umbilical to said control station, said umbilical providing control and power to the ROV unit under the ice or ice floes;
   c) operating the one or more ROV units under the ice or ice floes to deploy towed seismic sensors and recording equipment on or near the bottom of the body of water under the ice or ice floes;
   d) operating the same or another of the one or more ROV units under the ice or ice floes to deploy seismic source equipment on or near the bottom of the body of water under the ice or ice floes;
   e) generating and applying control signals to one or more of the ROV units for transfer to the equipment of c) and d) to generate and to record seismic signals;
   f) operating the one or more ROV units within the water under the ice or ice floes to move the seismic source equipment and seismic sensors and recording equipment to other locations, and to repeat c) through e) until completion.

2. The method of claim 1, wherein the seismic sensors comprise hydrophones emplaced in streamers towed by the one or more ROV units.

3. The method of claim 2, wherein the seismic sensors comprise three component (3C) geophones or accelerometers and at least one hydrophone connected to the one or more ROV units by wire or optic cable.

4. The method of any of claims 2-3, wherein the seismic sensors comprise three component (3C) geophones or accelerometers and at least one hydrophone housed in an autonomous case.

5. The method of any of claims 1-3, wherein the seismic source is vibratory, impulsive or explosive.

6. The method of any of claims 1-3, wherein the body of water is covered with ice and the control station is employed at or near an opening in the ice in the form of a fixed structure.

7. The method of any of claims 1-3, wherein the body of water is covered with light ice or ice floes, and the control station is employed at or near an opening in the light ice or ice floes from a marine vessel.

8. The method of any of claims 1-3, wherein the seismic source is connectedly attached to one or more of the one or more ROV units.

9. The method of claim 8 where the seismic source is vibratory.

10. The method of claim 9 wherein the seismic source comprises one or more linear motor vibrators located on or towed by the one or more ROV units.

11. The method of claim 9 wherein the seismic source is one or more electro-hydraulic vibrators located on or towed by the one or more ROV units.

12. The method of claim 8, wherein the seismic source is an impulsive seismic source.

13. The method of claim 1, further comprising operating the one or more ROV units to recover the deployed seismic sensors and recording equipment and seismic source equipment.

14. The method of claim 1, wherein the seismic data may be any of two dimensional (2D), three dimensional (3D), and four dimensional (4D).

* * * * *